United States Patent [19]

Vermeulen et al.

[11] Patent Number: 5,433,963
[45] Date of Patent: Jul. 18, 1995

[54] PROCESS FOR COOKING BEEF PATTIES TO ELIMINATE FOOT AND MOUTH DISEASE VIRUS

[75] Inventors: Pete V. Vermeulen, Lake Gregory; Hugh W. Bridgford, Fullerton, both of Calif.

[73] Assignee: Bridgford Foods Corporation, Anaheim, Calif.

[21] Appl. No.: 165,930

[22] Filed: Dec. 10, 1993

Related U.S. Application Data

[63] Continuation-in-part of Ser. No. 998,115, Dec. 28, 1992, abandoned, which is a continuation-in-part of Ser. No. 787,907, Nov. 5, 1991, abandoned.

[51] Int. Cl.$^6$ ................................................ A23L 1/00
[52] U.S. Cl. .................................. 426/233; 426/510; 426/523
[58] Field of Search ................ 426/233, 510, 523; 99/342, 443 C; 422/26

[56] References Cited

U.S. PATENT DOCUMENTS 4,036,995  7/1977  Koether et al. .................. 426/233
4,933,195  6/1990  Houck ............................. 426/233

FOREIGN PATENT DOCUMENTS 1-58938  12/1989  Japan ............................. 426/523

OTHER PUBLICATIONS

Uruguay official gazette No. 93,418 (ACTA No. 23,196) published on Sep. 10, 1991.
Blackwell et al, "Effect of Thermal Processing on the Survival of Foot-and-Mouth Disease Virus in Ground Meat", Journal of Food Science, vol. 47, 1982, pp. 388–392.
Blackwell et al, "Ingredient Effects on the Thermal Inactivation of Foot-and-Mouth Disease Virus in Formulated, Comminuted Meat Products", Journal of Food Science, vol. 54, No. 6, 1989, pp. 1479–1484.

*Primary Examiner*—George Yeung
*Attorney, Agent, or Firm*—Christie, Parker & Hale

[57] ABSTRACT

A method is described for cooking beef patties, which may be contaminated with the foot and mouth disease virus to produce cooked patties in which any foot and mouth disease virus has been inactivated. The method comprises preparing patties from a ground meat mixture having a desired fat content, and then cooking the patties in a broiler and then in a humidified oven.

19 Claims, No Drawings

PROCESS FOR COOKING BEEF PATTIES TO ELIMINATE FOOT AND MOUTH DISEASE VIRUS

RELATED APPLICATIONS

This application is a continuation-in-part of U.S. application Ser. No. 07/998,115 filed Dec. 28, 1992 which is a continuation-in-part of U.S. application Ser. No. 07/787,907 filed Nov. 5, 1991, now abandoned.

FIELD OF THE INVENTION

The present invention relates to methods for cooking beef to effectively destroy any foot and mouth disease virus present in the meat.

BACKGROUND OF THE INVENTION

Foot-and-mouth disease (FMD) is a serious economic disease of livestock. The causative agent can persist for considerable periods of time in the tissue of infected cattle and swine and has been found to have survived in a number of products produced from infected animals. This presents a risk of introducing FMD into non-affected countries through contaminated animal products, including meat. The possibility of introducing the virus into FMD free areas has led to regulations controlling the importation of animal products from countries where FMD exists.

Cooking of meat products in cans under retort conditions, boiling cuts of beef in plastic bags and cooking cuts of beef in ovens at high temperatures for extended periods of time has been shown to be an effective means of producing FMD virus-free products. However, the products which result from such treatments have very limited use due to their undesirable boiled flavor and texture.

FMD virus contaminated ground beef has been found to be decontaminated by cooking the beef in flexible pouches in water at 75° C. for 20 minutes, however, this product also had a taste and texture of boiled meat which, therefore, has limited use.

Other attempts to decontaminate ground beef and to overcome the undesirable effects of the above described cooking processes, have involved first broiling beef patties at 160° C. to 280° C. for 1 to 5 min. and then cooking the patties in an oven, in a humid environment, to an exit temperature of at least 93° C. While patties cooked in this manner were reported to be FMD virus free, there is no indication of the fat content of the patties. Fat is known to protect the FMD virus from thermal destruction. Additionally, it is desirable for beef patties to have a relatively high fat content since the presence of the fat adds to the organoleptic properties of the cooked product. The relatively mild cooking conditions described imply that the fat content of the patties was relatively low.

It is desirable to develop a process for cooking ground beef to effectively inactivate the FMD virus, where the ground beef has a high fat content, and where the cooked meat retains a desirable taste and texture.

It is also desirable that the meat has a fat content which is relatively high, 20% or more since the high fat content enhances the organoleptic qualities of the cooked product. However, the high fat content of meat is known to enhance the survival of FMD virus present in the meat. Therefore, it is desirable that the cooking conditions are sufficient to counteract the protective effects of the high fat content of the meat.

SUMMARY OF THE INVENTION

A method is described for cooking beef patties, which may be contaminated with the foot and mouth disease virus. The method comprises mixing skeletal muscle and fat to give a desired fat content, grinding the mixture to form a ground meat mixture and forming the ground meat mixture into patties. The patties are then cooked, sequentially, in a broiler and an oven. In a preferred embodiment of the invention the fat component of the patties comprises 20% to 28% by weight, and the patties are cooked in the oven for about 20 min. to an exit temperature of 99.7° C. The cooking process is effective in inactivating any foot and mouth disease virus contaminating the patties. The patties cooked in this manner retain their organoleptic properties.

DETAILED DESCRIPTION

The present invention relates to a process for producing ground beef patties which have been cooked to inactivate any contaminating FMD virus that may be present in the meat and yet to retain the organoleptic qualities of the meat.

Ground beef is prepared with a fat content of about 20% to about 28%, by weight, by the addition of pieces of beef trimmings with a high fat content. Usually the meat used for the preparation of the patties is skeletal muscle, which has a relatively low fat content. To increase the fat content to the desired levels pieces of beef trimmings with a high fat content are added and mixed with the skeletal muscle in the proportions required to give the desired fat content. The muscle and fat are then ground together. Other components such as flavoring or colorings may also be added. The meat is then formed into patties and cooked.

Initially the patties are cooked in a broiler at a "stack temperature" (the temperature of the exhaust air from the broiler) of about 370° C. to about 450° C. for about two to about two and one-half min. The processing in the broiler results in a patty with a desirable broiled flavor and texture and raises the internal temperature of the patty to about 99° to 100° C. However, while the broiler cooking step may cook the patties all the way through and, while the outside of the patties have a cooked appearance, they remain inadequately cooked to ensure inactivation of the FMD virus. Increasing the temperature or residency time in the broiler results in burning and drying of the outside of the patty. Over cooking in the broiler also results in a significant loss of the mass of the product.

After the broiler cooking step, the patties are subjected to cooking in a humidified oven. The humidified oven comprises a "live steam" injection system which allows the humidity in the oven to be maintained at saturation throughout the cooking process. During the cooking the patties are maintained at a temperature sufficient to inactivate any FMD virus present in the patties and are maintained at this temperature for a length of time which is effective in producing virus free patties.

Preferably, the patties are maintained at about 99° C. to about 100° C. for about 20 min. If the cooking is carried out for only about 15 min. or at lower temperatures it has been found that the patties may still contain viable FMD virus. If the temperature or residence time in the oven is increased the patties become overcooked which results in significant undesirable shrinkage of the patty.

Cooking of the patties in the oven alone would be sufficient for inactivation of the FMD virus, however, the resultant product would have an undesirable "boiled" taste, texture and appearance. Therefore, the combination of the broiler and steam oven cooking is desirable to effectively cook the meat and to result in a product with a desirable taste, texture and appearance.

Patties cooked as described above can then be frozen for long-term storage and shipping to the consumer.

A convenient method for cooking the patties, in production, is to use a conveyer belt which runs through the broiler and then, directly transfers the patties into the oven. The speed of the conveyer belt can be varied to increase or decrease the residency time of the patties in the broiler and oven as required to ensure proper cooking of the patties. In production, quality control of the cooking process is monitored to ensure that batches of patties have been subjected to a temperature sufficient to ensure any FMD virus contaminating the patties has been inactivated. Such monitoring can be achieved by the incorporation of a temperature indicator device (TID) in a selected number of patties throughout the cooking "run." A suitable TID for use in the present invention are devices which meet the standards of the U.S. Department of Agriculture and which are "buried in the beef patties. Such TID's undergo a color change at a preset temperature, which indicates that the beef patty has been cooked to the correct temperature. Such TID are commercially available and are well known in the art. When the cooked patties are packed, the TID, which is packed along with the patties, is a readily available indicator of the adequacy of the cooking process for government food inspectors.

In an experimental setting, testing is also conducted to ensure that the cooked patties are in fact free of FMD virus. Such testing allows the establishment of cooking conditions required to effectively inactivate FMD virus. This testing uses tissue culture and in vitro assays. To perform the assays a portion of the meat is removed from the center of patties and homogenized. After centrifugation of the homogenate, the resultant supernatant is inoculated into cattle, in a cattle assay, or into cell cultures, in a tissue culture assay.

EXAMPLE 1

Cattle Assay Procedures

It is necessary when determining conditions for the effective inactivation of the FMD virus to assay for the presence of virus in patties which have been contaminated with FMD virus. By this testing the cooking process can be evaluated for its effectiveness. One method of testing the patties for the presence of virus is to inoculate cattle, which have not previously been exposed to the virus, with an extract prepared from the patties and then to observe the cattle for the development of FMD. The following describes the procedure for preparing contaminated meat for the preparation of test patties and for performing an assay, for FMD, in cattle.

Cattle were also used to grow the FMD virus for the present study, i.e. to generate FMD contaminated tissue for the preparation of FMD contaminated patties.

I. Cattle

Grade Hereford steers, 12 to 18 months of age and weighing approximately 250 kg, were used in the cattle assays. Cattle were born and raised in isolation on an island in the interior of Uruguay before being transported to the Direction de Luch Contra la Fiebre Aftosa (DILFA), Ministerio de Ganaderia, Agricultura, Y Pesca (MGAP) facility in Pando, Uruguay. The cattle had no previous exposure to FMD.

II. FMD Virus

FMD virus 01 Serotype (Strain Campos) was used for the studies. This virus was originally isolated in a field outbreak and was obtained from the DILFA repository after 16 passages in cattle. The virus was passed once more in cattle, prior to use in these studies.

III. Preparation of Infectious FMD Virus Samples and Tissue

Infectious FMD virus samples were obtained by infecting susceptible cattle, by intradermal inoculation into the tongue, with 2.0 ml (0.1 ml over 20 sites) and 2.5 ml into the ventral portion of each nasal passage with $2 \times 10^6$ plaque forming units (PFU)/ml of virus suspension. Cattle were slaughtered after the appearance of clinical FMD symptoms, about 48 hours after infection. Esophageal-pharyngeal fluid and blood for infectivity assays were collected prior to inoculation with FMD virus.

Lymph nodes from the head, viscera, and body were collected from the slaughtered animals, which had been inoculated with FMD, to monitor viral stability, since lymphatic tissue contains high concentrations of FMD virus during the viremic stage of the infection and because FMD virus persists for long periods of time in these tissues.

Infectivity assays of the pooled infected lymph node tissue was performed in bovine tongue assays, as described below. The pooled tissue was homogenized as a 20% suspension in 0.01 M phosphate buffered saline solution, pH 7.6, containing 20% chloroform (v/v) in an Ultra Tourrax sonicator. The homogenate was clarified by centrifugation at 9,000 rpm for 20 min at 4° C. in a Sorval RC2B centrifuge. The supernatant fluid was collected, aseptically. Serial, 10-fold dilutions were prepared from the resultant supernatant in chilled 0.01 M phosphate buffered saline solution, pH 7.6 containing antibiotics, such as penicillin and streptomycin.

IV. Cattle Assays

The tongue of cattle was inoculated intradermally at 5 discrete lineal sites with 0.1 ml of the respective dilutions of infectious material, in order to determine the infectivity of a sample. Vesicles at the site of inoculation were enumerated visually 24 hours after inoculation and the FMD virus concentration was recorded as vesicle forming unit (VFU)/g of tissue extracted. Two susceptible cows were used per titration.

EXAMPLE 2

Preparation of Beef Patties

Chilled, hind quarter batches, approximately 25 kg, of cuts of skeletal muscle (classified as 90–95% lean), and pieces of beef trimmings with a high fat content, 98% free of skeletal muscle, were received daily into the processing area of the DILFA facility from a U.S. Department of Agriculture-approved meat packing plant in Uruguay. The meat and fat were mixed at a weight-weight ratio to give a composition of approximately 20–28% fat and the mixture was ground, using a Hobart meat grinder, with a die plate of 1.6 cm. A powdered flavoring formula concentrate was reconstituted in water and mixed manually into the meat-fat mixture, which was then ground through a 0.3 cm die plate. Fat and moisture determinations (Standards for Meat and Meat Products, Uruguayan Institute of Technical Standards) and pH measurements (Orion Digital Research Model with Ingold 9811 probe) were made on each batch of patties prepared. The results obtained for a number of different ground beef batches, prepared at different times, are presented in Table 1.

TABLE 1

Physical Characterization of Raw Patties

| Batch No. | pH | % Fat | % Moisture |
|---|---|---|---|
| 1 | 6.21 | 22.8 | 59.7 |
| 2 | 6.25 | 21.5 | 60.6 |
| 3 | 6.33 | 20.9 | 61.3 |
| 4 | 5.66 | 24.8 | 57.9 |
| 5 | 5.90 | 27.6 | 55.4 |

The results indicate that there was little variation between different production batches of ground beef which were prepared at different times.

EXAMPLE 3

Testing FMD Contaminated Patties

I. Patty Preparation

The patties, 11.8 cm×0.5 cm and weighing approximately 112±1 g each, were formed in a Hollymatic former (Model Super, Hollymatic Corp., Countryside, Il). Two separate batches of ground beef were prepared for each of three trials, each sample was assayed in triplicate.

Beef patties that served as FMD virus positive controls, also called virus monitor patties, were transported chilled to the Virus Laboratory and contaminated with FMD virus as follows: An approximate 10 g sample was removed from the center of a chilled patty and replaced with the same quantity of FMD virus-infected lymph node tissue, prepared as described in Example 1, and previously ground in a mechanical food chopper. A TID was inserted into the infected material. The contaminated patties were transported to the processing area under secure conditions.

II. Determination of the Heat Profile of the Oven

Trial processing runs were performed to determine the heating profile of the oven by arranging the patties in 9 rows with 5 patties per row, where a row is defined as the patties that run across the width of the conveyor belt. A TID was placed in the geometric center of each patty and the patties were processed in a conveyer-belt type oven, in a saturated steam environment. Different belt speeds were used so that the residence time of the patties in the oven was either 5, 10, 15 or 20 minutes The TID were then examined to determine the minimum core temperature achieved during the cooking process. Several locations were identified as cold zones in the oven for patties traversing the 5.9 m distance on the belt at the respective belt speeds.

In subsequent trials, the virus control patties were placed at the locations on the belt which had been identified as cold zones.

The reciprocal exchange of heat is less with patties in the first and last rows than it is for patties in the interior rows, therefore, a patty at one end of the first row was selected as a temperature control patty, also called temperature monitor patties, as well as a virus control patty.

The internal temperature of this virus/temperature control patty, as it passed through the oven, was measured by inserting the tip of a type T thermocouple (TMQ SS.06266, Omega Engineering, Inc.), connected to a microprocessor digital thermometer (HH 21, Omega Engineering Inc.) by a 9 m length of OSK cable (SB-TECT30-9), into the geometric center of the patty.

III. Processing of the Patties

Processing involved the initial cooking of patties in an automatic, wire-mesh belt feed, gas broiler, followed by direct feed, from the broiler, into a 6.7 m×0.9 m×0.75 m continuous belt fed oven for continued cooking in moist heat, the heat profile of which was determined as described in II above. The design of the heating system of the oven was such that chamber temperatures throughout the oven could be accurately controlled. The electrical system was fabricated so that additional heating elements could be placed, in series, to increase the chamber temperature.

The virucidal effect of processing using the broiler plus 5, 10, 15 and 20 minutes cooking, respectively, was examined. Forty-five patties were cooked per replication. Three replications were performed per trial and three trials were performed per processing condition, for a total of 405 patties per trial run.

IV. Assaying for FMD in Patties

To assay for the presence of FMD virus in the patties, the central core from each raw and thermally processed patty, contaminated with FMD virus-infected lymph node tissue, were removed from the patties, pooled separately, and homogenized as a 20% (w/v) suspension in 0.01 M phosphate buffered saline solution, pH 7.6, containing 20% chloroform (v/v) in an Ultra Tourrax sonicator. The homogenate was clarified by centrifugation at 9,000 rpm for 20 min at 4° C. in a Sorval RC2B centrifuge. The supernatant fluid was collected, aseptically. Serial 10-fold dilutions of the supernatants were prepared.

Tissue cultures and cattle were inoculated with the extract immediately after collection.

A. Tissue Culture Assay

The tissue culture assay for the presence of FMD virus was performed using confluent monolayers of baby hamster kidney cells, obtained from the DILFA repository. The cells were grown at 37° C. in minimum essential medium (MEM) supplemented with 5% (v/v) bovine serum in 13×125 mm PYREX roller tubes.

An inoculum of 0.05 ml samples was adsorbed onto the cell monolayer for one hour at 37° C. Medium was added to the cells and they were incubated at 37° C. for 48 hours. The cells were examined microscopically over the incubation period for cytopathic effect. When the effects of virus replication were observed, the virus concentration was recorded. A minimum of three replication per dilution were used.

B. Cattle Assay

Susceptible cattle were inoculated intradermally into the tongue with 2.0 ml of extract over 20 sites (0.1 ml per site). The animals were observed daily for the development of clinical FMD. When vesicular lesions developed, samples of material were harvested and typed serologically using serotype specific antibodies, by methods well known in the art. Blood samples were collected daily, for 7 days, from the inoculated cattle and examined for the presence of FMD virus.

The sera of cattle that remained negative after 14 days was examined for the presences of antibody to virus infection associated (VIA) antigen and of virus neutralizing activity.

V. Optimization of Cooking Conditions

Optimum control settings were developed for the broiler and oven, respectively, that allowed for the repetitive production of hamburger patties with desirable organoleptic traits. The insertion of additional heating elements in the oven permitted the maintenance of a minimum internal temperature (MIT) of the patty at 99 7° C. for about 20 min. as it traveled through the oven. The TID present in the virus control patties confirmed that the MIT had been reached.

Insertion of the thermocouple into the virus control patties was accomplished within 5 seconds of the patties leaving the oven, thereby, assuring only a minimal, transitory drop in temperature.

Patties cooked in the broiler alone, at 370° C. for 2 min. 9 sec., had a grilled exterior but their interiors were inadequately cooked to ensure inactivation of the FMD virus. Patties processed in the broiler and cooked for 5 min or longer in the oven, appeared to be thoroughly cooked. Product quality was assessed by professional taste panelists using double blind test procedures.

The product yield (weight after cooking as a percentage of the weight before cooking) remained constant through 5 to 15 minutes of oven cooking but decreased by 6% at 20 minutes. The results are presented in Table 2.

TABLE 2

Percent Product Loss of Cooked Patties

| Processing | Weight of Patties, kg* | | % Product Cooking Loss |
|---|---|---|---|
| | Raw | Cooked | |
| Broiler alone | 1.13 | 0.736 | 34.9 |
| Broiler + 5 min | 1.12 | 0.670 | 40.2 |
| Broiler + 10 min | 1.12 | 0.695 | 38.0 |
| Broiler + 15 min | 1.12 | 0.693 | 38.1 |
| Broiler + 20 min | 1.11 | 0.553 | 50.2 |

*Mean wt of patties from 3 replications, with 10 patties per replication.

An increase in overall chamber temperature, achieved by the addition of extra heating elements to the oven, resulted in product cooking loss after 15 and 20 minutes oven processing, of 48 to 49%, respectively. The results are summarized in Table 3.

TABLE 3

Percent Product Loss of Cooked Patties After addition of extra heating elements

| Processing | Weight of Patties, kg* | | % Product Cooking Loss |
|---|---|---|---|
| | Raw | Cooked | |
| Broiler + 15 min | 1.12 | 0.579 | 48.3 |
| Broiler + 20 min | 1.11 | 0.574 | 48.8 |

*Mean wt of patties time 3 replications at 10 patties per replication.

The overall appearance, taste, mouth feel and quality of the oven cooked products were consumer acceptable. However, the cooking of hamburger patties over a time period of 5 to 20 minutes to an endpoint temperature of 90° C. did not inactive FMD virus present in the infected lymph node tissue contaminated patties. The results are presented in Table 4.

TABLE 4

Effect of combination broiler-oven cooking on the survival of FMD virus in beef patties

| Cooking Process, time in oven (min.) | Mean Temperature of Product, °C. | | Virus Detected in Cooked Product[b] |
|---|---|---|---|
| | Raw Patty[a] | Exit from Oven | |
| 5 | 8.3 | 78.5 | 6/6 |
| 10 | 8.3 | 80.3 | 6/6 |
| 15 | 7.9 | 88.8 | 4/6 |

TABLE 4-continued

Effect of combination broiler-oven cooking on the survival of FMD virus in beef patties

| Cooking Process, time in oven (min.) | Mean Temperature of Product, °C. | | Virus Detected in Cooked Product[b] |
|---|---|---|---|
| | Raw Patty[a] | Exit from Oven | |
| 20 | 8.2 | 89.5 | 6/6 |

[a]Titration in the bovine tongue: The raw product had $1.4 \times 10^4$ vesicle forming units/g
[b]Number of cattle positive/Number of cattle inoculated (no virus was detected in cell cultures)

The patties cooked in the broiler alone had pink centers permeated with a reddish colored tissue fluid, however, after 5 minutes cooking in the oven, the products had a thoroughly cooked appearance.

The results indicate that a thoroughly cooked appearance in the patty, however, was no guarantee that FMD virus had been inactivated, as evidenced by the survival of the virus in the product cooked in the broiler followed by 5 minutes oven cooking.

Even under the more rigorous processing conditions, the virus persisted. For example, clinical FMD was manifested, after 11 days, in cattle that had been inoculated with samples prepared from pooled suspensions of patties which exited the oven at a mean temperature of 89° C. after a 20 minute cooking period, see Table 4.

The virus, however, was inactivated when patties were processed for 20 minutes to an endpoint temperature of 99.7° C. The results are summarized in Table 5.

TABLE 5

Effect of combination broiler-oven cooking on the survival of FMD virus in beef patties
*After addition of heating units

| Cooking Process, time in oven (min.) | Mean Temperature of Product, °C. | | Virus Detection in Cooked Product[b] |
|---|---|---|---|
| | Raw Patty[a] | Exit from Oven | |
| 15 | 12.1 | 99.9 | 6/6 |
| 20 | 10.4 | 99.7 | 0/6 |

[a]Titration in the bovine tongue, the raw product samples had $1.4 \times 10^4$ vesicle forming units/g
[b]Number of cattle positive/Number of cattle inoculated (no virus was detected in cell cultures)

The results indicate that the virus was not inactivated in the patties when cooked to an exit temperature of 99.9° C. over a 15 minute cooking period and strongly suggested the presence of a small fraction of surviving virus in the patties. The virus, however, was inactivated in patties processed for 20 minutes to an endpoint temperature of 99.7° C.

The role of fat in enhancing virus survival in ground beef products during the cooking has been documented, however, while it may have played a role in the survival of FMD virus in the patties processed to an exit temperature of about 89.5° C. after 20 min. treatment (see Table 4) and in those products processed for 15 minutes at an exit temperature of 99.9° C. (see Table 5), it did not protect FMD virus from inactivation in the product cooked for 20 minutes at an exit temperature of 99.7 (see Table 5).

The process described above for the manufacture of cooked hamburger patties not only produced a consumer acceptable product but was virucidal for FMD virus.

The above description of exemplary embodiments for the destruction of FMD by cooking are for illustrative purposes. Because of variations which will be apparent to those skilled in the art, the present invention is not intended to be limited to the particular embodiments described above. Also, the invention disclosed herein may be practiced in the absence of any element which is not specifically disclosed in the specification. The scope of the invention is defined by the following claims.

What is claimed is:

1. A method of cooking beef patties comprising:

preparing a ground meat mixture;

preparing patties from the ground meat mixture;

cooking the patties in a broiler; and cooking the patties in a humidifier oven at a temperature sufficient to inactivate any foot and mouth disease virus contaminating the patties.

2. The method of cooking beef patties as recited in claim 1 wherein the patties comprise 20% to 28% fat, by weight, prior to cooking.

3. The method of cooking beef patties as recited in claim 1 wherein the temperature of the broiler is 370° C. to 450° C. as measured by the temperature of exhaust air from the broiler.

4. The method of cooking beef patties as recited in claim 3 wherein the residence time of the patties in the broiler is 2 to 2.5 min.

5. The method of cooking beef patties as recited in claim 1 wherein the patties are cooked in the oven for about 20 minutes and the internal temperature of the patties is maintained at about 99.7° C.

6. The method of cooking beef patties as recited in claim 1 wherein the oven has a saturated atmosphere with respect to humidity.

7. The method of cooking beef patties as recited in claim 1 wherein the method further comprises the step of including a temperature indicator device in patties prior to cooking.

8. The method of cooking beef patties as recited in claim 1 further comprising freezing the cooked patties.

9. The method of cooking beef patties as recited in claim 1 further comprising mixing lean skeletal muscle and beef trimmings, with a high fat content, to give a desired fat content for preparing the ground beef.

10. The method as recited in claim 1 wherein the meat used to prepare the ground meat mixture is 100% beef.

11. A method of cooking beef patties to inactivate any foot and mouth disease virus comprising:

determining cold zones in an humidified oven;

placing temperature monitored patties and unmonitored patties on conveyer belts which traverse the oven such that the temperature monitored patties traverse the cold zones of the oven; and adjusting the temperature of the and the speed of the conveyor belt so that the internal temperature of the temperature monitored patties is maintained at a temperature of at least 99° C. for 20 min.

12. The method of cooking beef patties as recited in claim 11 further comprising placing virus control patties on the conveyer belt so that they traverse the cold portion of the oven.

13. The method of cooking beef patties as recited in claim 12 wherein the cooked patties are assayed for the presence of foot and mouth disease virus to determine the adequacy of the cooking conditions for the elimination of contaminating foot and mouth disease virus.

14. The method of cooking beef patties as recited in claim 11 wherein the patties comprise 20% to 28% fat, by weight, prior to cooking.

15. The method of cooking beef patties as recited in claim 11 wherein the method for cooking patties further comprises cooking the patties in a broiler.

16. The method of cooking beef patties as recited in claim 15 wherein the temperature of the broiler is 370° C. to 450° C., as measured by the temperature of exhaust air from the broiler.

17. The method of cooking beef patties as recited in claim 15 wherein the patties are cooked in the broiler for 2 to 2.5 min.

18. The method of cooking beef patties as recited in claim 11 wherein the oven has a saturated atmosphere with respect to humidity.

19. The method as recited in claim 11 wherein the meat used to prepare the ground meat mixture is 100% beef.

* * * * *

UNITED STATES PATENT AND TRADEMARK OFFICE
CERTIFICATE OF CORRECTION

PATENT NO.   : 5,433,963
DATED        : July 18, 1995
INVENTOR(S)  : Pete V. Vermeulen; Hugh W. Bridgford It is certified that error appears in the above-indentified patent and that said Letters Patent is hereby corrected as shown below:

Column 7, line 4, change "99 7°" to -- 99.7° --.

Column 7, line 56, change "inactive" to
         -- inactivate --.

Column 9, line 13, after "mixture" insert
         -- excluding pork --.

Column 10, line 7, before "humidified" change "an"
         to -- a --.

Column 10, line 12, after "temperature" delete "of the".

Signed and Sealed this

Seventeenth Day of October, 1995

Attest:

BRUCE LEHMAN

*Attesting Officer*          *Commissioner of Patents and Trademarks*